United States Patent [19]

Cervelle

[11] 3,928,585

[45] *Dec. 23, 1975

[54] TREATMENT OF HYPOAZOTEMIC AND ATHEROMATOUS CONDITIONS USING LESPECAPITOSIDE AND PROCESS FOR OBTAINING SAME

[76] Inventor: Claude Marie Henri Cervelle, 165 Boulevard Haussmann, Paris, France

[ * ] Notice: The portion of the term of this patent subsequent to Dec. 27, 1983, has been disclaimed.

[22] Filed: Apr. 28, 1967

[21] Appl. No.: 634,488

[30] Foreign Application Priority Data
May 5, 1966    France .............................. 66.60476
July 28, 1966   France .............................. 66.71310

[52] U.S. Cl. ............................. 424/195; 260/236.5
[51] Int. Cl.² ....................................... A61K 35/78
[58] Field of Search .................. 424/195; 260/236.5

[56] References Cited
UNITED STATES PATENTS
3,294,637   12/1966   Cervelle ............................. 424/331

OTHER PUBLICATIONS

Paris Academie Des. Sci. Compt. Rerd., T254, Jan. 8, 1962, pp. 352–353.

*Primary Examiner*—V. D. Turner
*Attorney, Agent, or Firm*—Baldwin, Wight & Brown

[57] ABSTRACT

This invention provides a new method of extraction of the flavonoid lespecapitoside from dried leaves of *lespedza capitosa*, said method comprising extracting the leaves with methanol, then evaporating the methanolic solution, taking up the residue on water, partitioning the aqueous solution with ethyl acetate evaporating the ethyl acetate solution, taking up the residue in alcohol, and recrystallisation therefrom. The lespecapitoside extracted by this method is purer than and has advantageous properties compared with that previously known. Its use in hypoazotemic and antiatheromatous) pharmaceutical compositions is described.

9 Claims, No Drawings

TREATMENT OF HYPOAZOTEMIC AND ATHEROMATOUS CONDITIONS USING LESPECAPITOSIDE AND PROCESS FOR OBTAINING SAME

This invention relates to a method of producing lespecapitoside, which is a flavonoid extracted from the leaves of *Lespedza capitata*. This extract, known as lespecapitoside, is in the form of a pale yellow powder which appears under the microscope as fine yellow crystals.

It is an object of my invention to provide a new and advantageous method for preparing lespecapitoside.

It is another object of my invention to provide lespecapitoside of a purity and advantageous properties hitherto unattainable.

It is a further object of my invention to provide new and useful pharmaceutical compositions containing such lespecapitoside as an active ingredient.

Further objects of my invention will become apparent later in this specification.

The new and advantageous lespecapitoside has the empirical formula $C_{21}H_{20}O_{11} \cdot H_2O$. Its melting point is 287°–288°C by the Maquenne block method and 250°C by the Kofler bench method. The absorption spectrum in ultraviolet light, in a 1/50,000 alcohol solution, has maxima at 260, 270, and 356 m$\mu$. In rising chromatography lespecapitoside furnishes a single spot of $R_f$: 0.46 with Partridge's butanol-acetic acid mixture; 0.39 with an acetic acid-water mixture (15–85); and 0.72 with an acetic acid-water mixture (60–40).

Said spot is bright yellow in colour when developed with aluminium trichloride and has a pinkish brown fluorescence when viewed in ultraviolet light.

The work of Professor Paris and his colleagues has disclosed a method of obtaining flavonoside by continuous extraction in the hot state by means of various solvents (petroleum ether, chloroform, ether, ethyl acetate), followed by concentration of the solvent, distillation under reduced pressure, and finally recrystallisation from alcohol and then from acetone.

I have now found that this method of extraction can be substantially improved by utilising the process according to the present invention which consists in:

i. drying leaves of *Lespedeza capitata* harvested in the months of June, July, or August;
ii. powdering said leaves;
iii. extracting the powder obtained in (ii) twice with methanol;
iv. evaporating the solution obtained in (iii) to dryness in vacuo;
v. taking up the residue obtained in (iv) in boiling water;
vi. extracting the aqueous solution obtained in (v) with ethyl acetate;
vii. evaporating in vacuo the solution in ethyl acetate obtained in (vi);
viii. taking up the residue obtained in (vii) in boiling 30° alcohol;
ix. and allowing the alcoholic solution obtained in (viii) to crystallise by cooling.

It is advantageous to dry the leaves of *Lespedza capitata*, harvested between June and July, by the method indicated inter alia in the thesis by Alain G. Charles: "Contribution a l'étude du Lespedeza Capitata Michx. Légumineuse a flavonoides (1962)".

The extractions with methanol are preferably effected on each occasion with 5 litres of methanol per 1 kg of powdered leaves.

The extraction of the aqueous solution with ethyl acetate is preferably performed with an amount of ethyl acetate equal in volume to the aqueous solution and is preferably effected by dividing the volume of ethyl acetate into ten equal parts with which ten small successive extractions are effected to yield 10 ethyl acetate solutions containing the lespecapitoside, the impurities remaining in the water.

The step (viii) is advantageously performed by using a volume of 30° alcohol equal to one quarter of the volume of the original ethyl acetate solution before evaporation.

It is immediately seen that the process according to the invention provides great advantages over the previous method of production; it achieves in fact an economy in solvents used as well as a saving of time required for the operations and improves the final yield which is from 4 to 6 per thousand instead of 1 per thousand as in the case of the known process.

The yield of lespecapitoside is from 4 to 5 % of dry plant, depending on the quality of the leaves used.

Two examples of performance of the process are given below.

EXAMPLE 1

1. 300 g of *Lespedeza capitata* leaves, dried and pulverised to a semi-fine powder were extracted in a Soxhlet apparatus for 2 hours with 1.5 liter of boiling methanol; after maceration for 12 hours the operation was repeated with the same quantity of methanol.

2. The two strainings were combined and evaporated to dryness under reduced pressure (with the aid of a simple water-jet pump).

3. The residue was taken up immediately and while still hot (without taking time to weigh it) first with 200 ml and then with 100 ml of boiling water, with vigorous agitation; the two solutions were combined and immediately filtered.

4. The aqueous solution (300 ml) thus obtained and while still hot was immediately freed from fat by treating three times with 200 ml of ether, which were eliminated by decanting in a separating funnel.

The resulting aqueous solution freed from fat was then immediately extracted on 10 occasions during a period of 2 hours, each time with 50 ml of ethyl acetate, operating in a separating funnel. The 10 ethyl acetate liquors were combined, and 500 ml of ethyl acetate solution were thus obtained.

5. The 500 ml of ethyl acetate solution were evaporated to dryness under reduced pressure (with the water-jet pump).

6. The residue was then immediately taken up while still hot (without being weighed) in 80 ml and then 45 ml of boiling 30° ethyl alcohol, with vigorous agitation; while still hot the product was immediately filtered and 125 cc of alcoholic solution were obtained.

7. The filtrate was placed in a refrigerator; after three days, 1.48 g of crystallised lespecapitoside were collected by filtration, that is to say a yield of about 5 per thousand.

EXAMPLE 2

The same quantities were treated as in Example 1, operating in accordance with paragraphs 1 to 4 in that example.

After obtaining 500 ml of ethyl acetate solution as indicated above, the aqueous solution already extracted with ethyl acetate was treated by carrying out a second series of ten extractions, each time with 50 ml of ethyl acetate with the addition of 5 % of methanol. 500 ml of solution were obtained, which were added to the 500 ml obtained previously.

The 1000 ml were treated in accordance with paragraphs 5, 6, and 7 of Example 1.

1.72 g of lespecapitoside was thus obtained, corresponding approximately to a yield of 5.75 per thousand.

In the industrial performance of the process, relating to 100 kg of plants, the following successive results were obtained:

After extraction with methanol, filtration, concentration to dryness, taking up with water, extraction with ethyl acetate, concentration, and drying, 21.400 kg were obtained.

After taking up with 30° alcohol and filtration, the preparation was left for 15 days at ambient temperature.

After draining, washing the drained cake, drying, and grinding, 0.500 kg of lespecapitoside was collected.

The lespecapitoside obtained is a flavonoid of the active principle extracted from the leaves of the *Lespedeza capitata*, the therapeutical properties of which are hypoazotemic and antiatheromatous, protecting the arterial walls against lipoid infiltrations.

The toxicity of lespecapitoside was studied under the following conditions:

1. Control of innocuity

A. Intraperitoneal method

A batch of 10 male albino mice of 20 to 25 are observed for a few days before treatment.

Each animal then receives by intraperitoneal injection a dose of 400 mg of lespecapitoside per kg body weight, in the form of a fine, homogeneous suspension in apyrogenous physiological serum. The mice were returned to their usual living conditions: temperature 18° to 20° C, water ad libitum, standard food. The period of observation is 5 days, during which any deaths are counted; deaths, expressed in %, should not exceed 10 %. Results:

| Lespecapitoside | Deaths |
|---|---|
| Batch 4-2-63 | 0 % |
| Batch 9-3-63 | 10 % |
| Batch 2-4-63 | 0 % |
| Batch 7-6-63 | 0 % |

B. Oral administration

Doses of 100 and 500 mg of lespecapitoside per kg of animal, in the form of a fine 2 % suspension in gelatinous water, are administered by gastric intubation to mice selected as previously.

At the end of 8 days no death was noted in two batches of 20 mice, one of which had received 100 mg/kg per animal and the other 500 mg/kg per animal.

2. Injectability test

Tests were made in respect of intravenous injectability tissue tolerance, and the pyrogenic test.

Ampoules containing 0.01 g of lespecapitoside in 0.5 cc of 70° alcohol, to be diluted extemporaneously at the moment of the injection in 5 or 10 cc of apyrogenous physiological serum, were used.

a. Intravenous injectability

The contents of 4 ampoules of alcoholic lespecapitoside in 20 cc of sterile apyrogenous physiological serum were injected in a male rabbit weighing 3.200 kg.

The injection was made in the marginal vein of the ear and carried out slowly. The period of observation was 8 days.

Results:

The animal showed no symptom of shock or intolerance either during the first 24 hours or in the course of the 8 days of observation.

b. Tissue tolerance

The preparation is injected in a restricted volume (0.05 cc) in the derm:

of the inner skin of a rabbit's ear;
of the epilated skin of a guinea-pig's back.

Control injections were made in the same region with sterile isotonic serum.

Two dilutions of lespecapitoside were used:

1 ampoule in 5 cc of isotonic serum;
1 ampoule in 10 cc of isotonic serum.

Results:

With two dilutions resorption was perfect both in the case of the rabbit's ear and in the case of the guinea-pig's back.

c. Pyrogenic test

Each of the three rabbits received through the marginal vein of the ear a dose of 1 ampoule (0.5 cc) of lespecapitoside diluted in 10 cc of sterile apyrogenous physiological serum.

In addition, 10 cc of the apyrogenous physiological serum used to dilute the lespecapitoside was injected in a control rabbit.

Results:

Variations of rectal temperature in degrees centigrade:

| Time | Lespecapitoside | Apyrogenous serum |
|---|---|---|
| 0 : | 0 : 0 : 0 | 0 |
| 1 h : | + 0.1 : + 0.3 : + 0.2 | − 0.1 |
| 1½h: | + 0.2 : + 0.3 : + 0.3 | + 0.2 |
| 2 h : | + 0.1 : + 0.3 : + 0.2 | + 0.2 |
| 3 h : | + 0.2 : + 0.3 : + 0.2 | 0 |

Conclusions:

Pyrogenic test according to Codex = negative.

From the pharmacological point of view the following were examined:

1. Antiatheromatous properties 30 rabbits distributed in two batches and all subjected to the same hypercholesterolemiant atherogenous diet were treated.

The first batch served for control.

The second batch received by means of a gastric catheter 0.2 mg per kg of animal of pure lespecapitoside in a 2 % alcoholic solution, that is to say 0.1 cc of solution per kg per diem.

On the 68th day of the treatment the results were as follows:

| 1st batch: plain atherogenous diet | 2nd batch: atherogenous diet + lespecapitoside |
|---|---|
| Total lipoids (g/l) 35.5 : | 17.43 |
| Total cholesterol (g/l) 16.98 : | 8.35 |
| Esterified cholesterol (g/l) 12.02 : | 5.87 |
| Free cholesterol (g/l) 4.96 : | 2.48 |
| Lipoid phosphorus (mg/l) 250 : | 144.7 |
| Esterified fatty acids (meq/l) 19.5 : | 12.9 |

The degree of atheromatous lesions, evaluated macroscopically on the aorta during the autopsy of the animals and estimated in accordance with the same code for the two batches is as follows:

|  | 1st batch | 2nd batch |
|---|---|---|
| Mean degree of lesions of aorta on autopsy | 2.7 | 1.7 |

Examination of these results shows that the rate of the various blood lipoids after two months' experimentation is much higher in the animals treated with lespecapitoside and that their aortic lesions are markedly less extensive on autopsy than those of the untreated control animals.

2. Hypoazotemic properties

Azotemic hypertensive nephritis was induced in rabbits by injection of an anti-kidney serum. Treatment for 10 days by gastric catheter was a water-alcohol extract of *Lespedeza capitata* corresponding to a daily dose of 0.5 mg of lespacapitoside per kg of animal made it possible to detect the forming reduction of blood urea (g/l):

| 1st day | 10th day |
|---|---|
| 1.40 | 0.60 |
| 1.27 | 0.35 |
| 1.86 | 0.76 |
| 0.96 | 0.25 |
| 2.10 | 1.85 |

The control animals on the other hand showed no lowering of hyperazotemia.

Clinical study permitted the following observations and conclusions:

1. Antiatheromatous properties

A 3 per 1000 solution of lespecapitoside in 90° alcohol was used.

This solution was prescribed at the daily dosage of two teaspoonfuls (10 cc), that is to say 0.03 g of lespecapitoside. 22 patients whose high seric lipid rate had been studied for 17 months in the case of 13 of them and 6 weeks in the case of the other 9 were treated.

After treatment for 3 months a very marked action was noted on the triglycerides (average lower than 13.1 %) and particularly on the very slow $\beta^2$ lipoproteins (chylomicrons), which was revealed by study of the lipidogram, the "trail" of which shows a mean reduction of 17.1 %.

In this group of 22 patients the value of the "trail" was reduced in 16 patients, that is to say in 72 % of the cases.

2. Hypoazotemic properties

Within a period of from 7 to 15 days the medicine effects a lowering of the urea rate without special resting or dieting, for extrarenal azotemia with a daily dosage of 0.005 to 0.01 g, administered orally, intravenously, or intramuscularly.

For hyperazotemia of purely renal origin the results are favourable for sub-acute nephritis and also for chronic nephritis which has not reached the terminal stage.

Lespecapitoside may be administered:

In a 3/1000 water-90° alcohol solution in the form of a solute to be taken at the rate of 1 to 3 teaspoonfuls per day (5 to 15 cc);

In a solution which is injectable intravenously or intramuscularly at the rate of 1 to 3 ampoules per day, each containing 0.01 g of lespecapitoside;

In the form of cachets, tablets, capsules, ampoules to be taken internally or suppositories, with the same dosages as the solute taken internally.

In all cases the doses indicated may be increased considerably because of the absolute non-toxicity of lespecapitoside.

We claim:

1. A process for the production of lespecapitoside which comprises:
   i. drying leaves of *Lespedeza capitata* harvested in the months of June, July, or August;
   ii. powdering said leaves;
   iii. extracting the powder obtained in (ii) twice with methanol;
   iv. evaporating the solution obtained in (iii) to dryness in vacuo;
   v. taking up the residue in (iv) in boiling water;
   vi. extracting the aqueous solution obtained in (v) with ethyl acetate;
   vii. evaporating in vacuo the solution in ethyl acetate obtained in (vi);
   viii. taking up the residue obtained in (vii) in boiling 30° alcohol;
   ix. and cooling the alcoholic solution obtained in (viii) to obtain crystals.

2. A process as claimed in claim 1 which comprises in step (iii) extracting the powder on each occasion with 5 liters of methanol to each kilogram of powdered leaves.

3. A process as claimed in claim 1 which comprises taking up the residue in step (v) with an amount of boiling water equivalent in weight to the quantity of dried leaves originally used in step (ii).

4. A process as claimed in claim 1 which comprises extracting the aqueous solution in step (v) with an equal amount of ethyl acetate.

5. A process as claimed in claim 4 which comprises in step (vi) dividing the ethyl acetate into ten equal portions and extracting the aqueous solution successively with each.

6. A process as claimed in claim 1 which comprises taking up the residue in step (viii) in a quantity of 30° alcohol equal to a quarter of the volume of the original ethyl acetate before evaporation.

7. A method of relieving a hypoazotemic or atheromatous condition in a subject which comprises administering to said test subject lespecapitoside which is a pale yellow powder having the empirical formula $C_{21}H_{20}O_{11}\cdot H_2O$, and the following properties;
   i. a melting point of 287°–288°C. by the Maquenue block method;
   ii. a melting point of 250°C. by the Kofler bench method;
   iii. an ultraviolet absorption spectrum in 1/50000 alcoholic solution having maxima at 260, 270, and 356 m$\mu$.;
   iv. on rising chromatography gives a single spot of $R_f$:

0.46 in Partridge's butanol-acetic acid mixture;
0.39 in acetic acid-water mixture (15:85);
0.72 in acetic acid-water mixture (60:40),
said spot being bright yellow when developed with aluminium trichloride and having a pinkish brown fluorescence when viewed in ultraviolet light,
in an amount effective to relieve a hypoazotemic or atheromatous condition.

8. The method of claim 7 wherein said lespecapitoside is administered as a drinkable solution or in a form selected from the group consisting of a cachet, capsule, ampoule, and suppository at the rate of 0.01 to 0.05 grams of lespecapitoside per day.

9. The method of claim 7 wherein said lespecapitoside is administered by intravenous or intramuscular injection at the rate of 0.01 to 0.3 grams of lespecapitoside per day.

* * * * *